US012630467B2

(12) United States Patent
Choi et al.

(10) Patent No.: US 12,630,467 B2
(45) Date of Patent: May 19, 2026

(54) LOW-TEMPERATURE-FIRED LEAD-FREE GLASS FRIT, PASTE, AND VACUUM GLASS ASSEMBLY USING SAME

(71) Applicants: LG ELECTRONICS INC., Seoul (KR); PUSAN NATIONAL UNIVERSITY INDUSTRY-UNIVERSITY COOPERATION FOUNDATION, Busan (KR)

(72) Inventors: Wongyu Choi, Seoul (KR); Young Seok Kim, Seoul (KR); Bong-Ki Ryu, Busan (KR); Jae-Young Shin, Busan (KR); Dae-Geol Jeong, Busan (KR)

(73) Assignee: LG ELECTRONICS INC., Seoul (KR)

( * ) Notice: Subject to any disclaimer, the term of this patent is extended or adjusted under 35 U.S.C. 154(b) by 1161 days.

(21) Appl. No.: 17/424,849

(22) PCT Filed: Feb. 7, 2019

(86) PCT No.: PCT/KR2019/001550
§ 371 (c)(1),
(2) Date: Jul. 21, 2021

(87) PCT Pub. No.: WO2020/158982
PCT Pub. Date: Aug. 6, 2020

(65) Prior Publication Data
US 2022/0098088 A1 Mar. 31, 2022

(30) Foreign Application Priority Data
Jan. 30, 2019 (KR) ........................ 10-2019-0012256

(51) Int. Cl.
*C03C 8/08* (2006.01)
*C03B 23/20* (2006.01)
*C03C 8/16* (2006.01)

(52) U.S. Cl.
CPC ................ *C03C 8/08* (2013.01); *C03B 23/20* (2013.01); *C03C 8/16* (2013.01)

(58) Field of Classification Search
CPC .... C03C 3/21; C03C 8/08; C03C 8/16; C03C 3/122; C03C 3/16; C03B 23/20; C03B 23/245; E06B 3/6612; E06B 3/663
See application file for complete search history.

(56) References Cited

U.S. PATENT DOCUMENTS

| | | | |
|---|---|---|---|
| 10,252,938 B2 | 4/2019 | Sawai et al. | |
| 10,745,317 B2 | 8/2020 | Gödeke et al. | |
| 2010/0044730 A1 | 2/2010 | Kwon et al. | |
| 2010/0180934 A1 | 7/2010 | Naito et al. | |
| 2013/0333748 A1 | 12/2013 | Naito et al. | |
| 2014/0378581 A1 | 12/2014 | Aoyagi et al. | |
| 2015/0008573 A1 | 1/2015 | Sawai et al. | |
| 2016/0096768 A1 | 4/2016 | Takao et al. | |
| 2016/0229737 A1 | 8/2016 | Naito et al. | |
| 2017/0349479 A1 | 12/2017 | Yanagisawa et al. | |
| 2023/0101150 A1 | 3/2023 | Choi et al. | |

FOREIGN PATENT DOCUMENTS

| | | | | |
|---|---|---|---|---|
| CN | 101781090 A | | 7/2010 | |
| CN | 109133648 A | * | 1/2019 | ............. C03C 8/24 |
| CN | 111727175 A | | 9/2020 | |
| EP | 3414209 | | 6/2021 | |
| JP | 2006342044 A | | 12/2006 | |
| JP | 2012106891 A | | 6/2012 | |
| KR | 20060116171 A | * | 11/2006 | |
| KR | 20090087997 A | | 8/2009 | |
| KR | 20160053842 A | | 5/2016 | |
| KR | 20160104917 A | | 9/2016 | |
| KR | 20170011866 A | | 2/2017 | |
| KR | 20170096026 A | | 8/2017 | |
| RU | 2013395 C1 | | 5/1994 | |
| RU | 1736107 A1 | | 11/1995 | |
| WO | 2016123273 A1 | | 8/2016 | |

OTHER PUBLICATIONS

Jae-Young Shin, et al. "Effect of Bi2O3 on thermal, chemical durability, and 1-8 bonding properties of V2O5—P2O5—TeO2 glasses for low-temperature sealing glass", Journal of the Ceramic Society of Japan, 2018.

* cited by examiner

*Primary Examiner* — Shuangyi Abu Ali
(74) *Attorney, Agent, or Firm* — Bryan Cave Leighton Painser LLP

(57) ABSTRACT
The present disclosure relates to a low temperature-calcined lead-free glass frit and paste, and a vacuum glass assembly using the same. The glass frit has a novel component system, in which phosphorus pentoxide ($P_2O_5$), vanadium pentoxide ($V_2O_5$), tellurium dioxide ($TeO_2$), copper oxide (CuO), barium oxide (BaO), zinc oxide (ZnO), bismuth oxide ($Bi_2O_3$), and silver oxide ($Ag_2O$) are included at a unique composition ratio according to the disclosure, and replaces a lead-based glass composition of the related art, is calcined at low temperature, includes no inorganic filter or include a minimum amount of an inorganic filler, has a coefficient of thermal expansion matching a coefficient of thermal expansion of a glass base material to prevent a separation or damage, and ensures excellent durability.

12 Claims, No Drawings

LOW-TEMPERATURE-FIRED LEAD-FREE GLASS FRIT, PASTE, AND VACUUM GLASS ASSEMBLY USING SAME

CROSS-REFERENCE TO RELATED APPLICATION

This application is the National Stage filing under 35 U.S.C. 371 of International Application No. PCT/KR2019/001550, filed Feb. 7, 2019, which claims priority to and the benefit of Korean Patent Application No. 10-2019-0012256, filed on Jan. 30, 2019, the disclosure of which is incorporated herein by reference in its entirety.

TECHNICAL FIELD

Disclosed herein is a low temperature-calcined lead-free glass frit and paste, and a vacuum glass assembly using the same.

BACKGROUND ART

Window glass for construction or home appliances, or electric and electronic parts such as a multi-layer vacuum insulated glass panel, a display panel, an organic EL display panel and the like are sealed or attached by a glass frit including a glass composition and inorganic ceramic particles. The glass frit for sealing is usually applied in the form of paste, and the glass paste is applied onto glass using a screen printing method or a dispensing method and the like, is dried and then is calcined, to have a sealing function.

A $PbO$—$B_2O_3$-based glass composition including a large amount of lead oxide has been widely used. The $PbO$—$B_2O_3$-based glass composition has a softening point ranging from approximately 400 to 450° C. Accordingly, the $PbO$—$B_2O_3$-based glass composition shows desirable fluidity and softening properties and has relatively high chemical reliability.

At a time when the environment is top priority across the world, the demand for environmentally friendly materials grows. For example, Directive of Restriction of Hazardous Substances (RoHS) in Electrical and Electronic Equipment came into force in Jul. 1, 2006 in European countries. Under the directive, the use of a total of six materials including lead is banned.

The $PbO$—$B_2O_3$-based glass composition includes large amounts of lead that is banned in accordance with the RoHS Directive. Accordingly, the glass composition cannot be used for glass paste for sealing. Under the circumstances, there is a growing need for a novel glass composition including no lead. Additionally, the demand for a lead-free glass composition, which replaces the $PbO$—$B_2O_3$-based glass composition, ensures low temperature softening and low temperature fluidity and has chemical reliability, grows to reduce thermal degradation of various types of glass-sealed parts or glass-sealed electric and electronic parts and to improve productivity.

A $P_2O_5$—$V_2O_5$—$TeO_2$-based lead-free glass composition is widely known as the lead-free glass composition that includes no lead and is calcined at low temperature.

The $P_2O_5$—$V_2O_5$—$TeO_2$-based lead-free glass composition of the related art does not have a coefficient of thermal expansion that matches a coefficient of thermal expansion of a glass base material, while being calcined at low temperature. Accordingly, the $P_2O_5$—$V_2O_5$—$TeO_2$-based lead-free glass composition is likely to be vulnerable to separation or damage. To solve the problem, a large amount of inorganic fillers are used for the $P_2O_5$—$V_2O_5$—$TeO_2$-based lead-free glass composition of the related art. In this case, the coefficients of thermal expansion of the $P_2O_5$—$V_2O_5$—$TeO_2$-based lead-free glass composition and the glass base material are matched but the price of a product increases.

Additionally, $V_2O_5$ in the $P_2O_5$—$V_2O_5$—$TeO_2$-based glass composition of the related art reacts with moisture. Accordingly, chemical durability of a glass assembly including the $P_2O_5$—$V_2O_5$—$TeO_2$-based glass composition of the related art deteriorates. Further, the $P_2O_5$—$V_2O_5$—$TeO_2$-based glass composition of the related art cannot ensure proper strength of adhesion to a glass base material. Thus, a glass assembly including the $P_2O_5$—$V_2O_5$—$TeO_2$-based glass composition of the related art cannot ensure long-term reliability.

The $P_2O_5$—$V_2O_5$—$TeO_2$-based glass composition of the related art is highly likely to crystallize during a calcination process. Accordingly, the $P_2O_5$—$V_2O_5$—$TeO_2$-based glass composition cannot ensure desirable fluidity and softening properties.

DESCRIPTION OF INVENTION

Technical Problem

The present disclosure is directed to a novel low temperature-calcined lead-free glass frit that may be calcined at low temperature as a lead-free glass composition replacing a lead-based glass composition of the related art.

The present disclosure is directed to a low temperature-calcined lead-free glass frit that may be calcined at low temperature and may have a novel composition ratio at which a coefficient of thermal expansion of the glass frit matches a coefficient of thermal expansion of a glass base material without an organic filler.

The present disclosure is directed to a low temperature-calcined lead-free glass frit that may ensure excellent chemical durability and bond strength, thereby improving reliability.

The present disclosure is directed to a low temperature-calcined lead-free glass frit that may have a novel composition ratio at which a low crystallization tendency is ensured even when the glass frit is calcined at low temperature.

Technical Solution

To provide a glass frit, which may be calcined at low temperature, may include no inorganic filter or include a minimum amount of an inorganic filler, may have a coefficient of thermal expansion matching a coefficient of thermal expansion of a glass base material to prevent a separation or damage and may ensure excellent durability, as a lead-free glass composition replacing a lead-based glass composition of the related art, the glass frit according to the present disclosure may include 10-20 wt % of phosphorus pentoxide ($P_2O_5$), 50-70 wt % of vanadium pentoxide ($V_2O_5$), 5-20 wt % of tellurium dioxide ($TeO_2$), 1-5 wt % of copper oxide (CuO), 1-20 wt % of one or more of barium oxide (BaO) and zinc oxide (ZnO), and 10-30 wt % of one or more of bismuth oxide ($Bi_2O_3$) and silver oxide ($Ag_2O$).

To improve chemical durability and maximize bond strength between the glass frit and a glass base material, the glass frit according to the present disclosure may include a proper amount of one or more of barium oxide (BaO) and zinc oxide (ZnO), and a proper amount of one or more of bismuth oxide ($Bi_2O_3$) and silver oxide ($Ag_2O$).

To provide a glass frit that may be calcined at low temperature and may ensure a low crystallization tendency during low-temperature calcination, the glass frit according to the disclosure may satisfy a following equation of a relationship among $P_2O_5$ content, $V_2O_5$ content, and $TeO_2$ content.

$$V_2O_5 \text{ (wt \%)}/P_2O_5 \text{ (wt \%)}<3.5$$

$$P_2O_5 \text{ (wt \%)}+TeO_2 \text{ (wt \%)}>25 \qquad \text{[Relationship equation]}$$

Advantageous Effect

A glass frit according to the present disclosure may have a novel component system in which $P_2O_5$, $V_2O_5$, $TeO_2$, CuO, BaO, ZnO, $Bi_2O_3$, and $Ag_2O$ are included at a unique composition ratio according to the disclosure, thereby replacing a lead-based glass composition of the related art and being calcined at low temperature.

The glass frit according to the present disclosure may have a coefficient of thermal expansion (CTE) that is within a range of 80 to $100\times10^{-7}/°$ C. after being calcined and matches a coefficient of thermal expansion of a glass base material without any inorganic filter or with a minimum amount of an inorganic filler, thereby preventing a separation or damage and ensuring excellent durability.

The glass frit according to the present disclosure may include a proper amount of one or more of barium oxide (BaO) and zinc oxide (ZnO), and a proper amount of one or more of bismuth oxide ($Bi_2O_3$) and silver oxide ($Ag_2O$), thereby improving chemical durability and bond strength between the glass frit and a glass base material.

The glass frit according to the present disclosure may ensure an optimal content ratio of $P_2O_5$, $V_2O_5$ and $TeO_2$, may be calcined at low temperature and may show a low crystallization tendency even during low-temperature calcination.

DETAILED DESCRIPTION OF EXEMPLARY EMBODIMENT

The above-described aspects, features and advantages are specifically described hereunder with reference to the accompanying drawings such that one having ordinary skill in the art to which the present disclosure pertains can easily implement the technical spirit of the disclosure. In the disclosure, detailed description of known technologies in relation to the disclosure is omitted if it is deemed to make the gist of the disclosure unnecessarily vague. Below, preferred embodiments according to the disclosure are specifically described.

Embodiments can be implemented in various different forms, and should not be construed as being limited only to the embodiments set forth herein. Rather, the embodiments in the disclosure are provided as examples so that the present disclosure will be thorough and complete and will fully convey the scope of the disclosure to one having ordinary skill in the art to which the disclosure pertains.

A low temperature-calcined lead-free glass frit and paste, and a vacuum glass assembly using the same according to the present are described hereunder.

Low Temperature-Calcined Lead-Free Glass Frit

When temperatures related to physical properties such as a glass transition point and a softening point of a glass frit used as a sealing material are low, low temperature fluidity may improve. However, when the temperatures related to physical properties are too low, a crystallization tendency may increase, thereby causing deterioration in the low temperature fluidity.

Additionally, when glass used for home appliances or electronic products is exposed to a sealing process at high temperature, the glass may be broken or costs incurred in the sealing process may increase. To prevent this from happening, the sealing process needs to be performed at 400° C. or less. Glass not only for home appliances but also for window glass for construction may be exposed to a sealing process for various reasons including cost savings and the like. Accordingly, a glass frit sealing material used in the sealing process needs to be able to be calcined at low temperature and needs to ensure a proper degree of fluidity and softening.

As a result, a novel glass frit, which may be calcined at low temperature and may ensure a low crystallization tendency, was manufactured.

The glass frit according to the disclosure may include 10-20 wt % of phosphorus pentoxide ($P_2O_5$), 50-70 wt % of vanadium pentoxide ($V_2O_5$), 5-20 wt % of tellurium dioxide ($TeO_2$), 1-5 wt % of copper oxide (CuO), 1-20 wt % of one or more of barium oxide (BaO) and zinc oxide (ZnO), and 10-30 wt % of one or more of bismuth oxide ($Bi_2O_3$) and silver oxide ($Ag_2O$).

To lower the calcination temperature of the glass frit and control fluidity of the glass frit, 10-20 wt % of $P_2O_5$ may be included in the glass frit. When greater than 20 wt % of $P_2O_5$ is included, the glass frit may hardly be calcined and fluidity may be reduced. When less than 10 wt % of $P_2O_5$ is included, the coefficient of thermal expansion of the glass frit may increase, and adhesive strength between the glass frit and a glass base material may decrease.

The component $V_2O_5$ may improve durability of the glass frit and lower a softening point, and 50-70 wt % of $V_2O_5$ may be included in the glass frit. When greater than 70 wt % of $V_2O_5$ is included, it may be difficult to calcine the glass frit. When less than 50 wt % of $V_2O_5$ is included, an effect of lowering the softening point of the glass frit may not be sufficiently produced. Additionally, the durability of the glass frit may deteriorate.

The component $TeO_2$ may improve fluidity of the glass frit, and 5-20 wt % of $TeO_2$ may be included in the glass frit. When greater than 20 wt % of $TeO_2$ is included, the softening point of the glass frit may not be sufficiently lowered, and the glass frit may hardly be calcined. When less than 5 wt % of $TeO_2$ is included, it may be difficult to vitrify the glass frit depending on a balance between $TeO_2$ and another component.

To ensure a coefficient of thermal expansion required by the glass frit and to meet durability requirements of the glass frit, and 1-5 wt % of CuO may be included in the glass frit. When greater than 5 wt % of CuO is included, the fluidity of the glass frit may deteriorate. When less than 1 wt % of CuO is included, the coefficient of thermal expansion required by the glass frit may not be ensured.

To ensure the coefficient of thermal expansion required by the glass frit, improve chemical durability of the glass frit and increase adhesive strength between the glass frit and a glass base material, 1-20 wt % of one or more of BaO and ZnO may be included in the glass frit. When greater than 20 wt % of one or more of BaO and ZnO is included, the fluidity of the glass frit may deteriorate, and durability and reliability of the glass frit such as an adhesive force between the glass frit and a glass base material may deteriorate. When less than 1 wt % of one or more of BaO and ZnO is included, the coefficient of thermal expansion required by the glass frit may not be ensured.

To reduce a crystallization tendency of the glass frit and maximize chemical durability and adhesive strength between the glass frit and a glass base material, 1-30 wt % of one or more of $Bi_2O_3$ and $Ag_2O$ may be included in the glass frit. When greater than 30 wt % of one or more of $Bi_2O_3$ and $Ag_2O$ is included, the crystallization tendency may be lowered, but sealing performance may deteriorate. When less than 1 wt % of one or more of $Bi_2O_3$ and $Ag_2O$ is included, chemical durability required by the glass frit and adhesive strength between the glass frit and a glass base material may not be ensured.

Additionally, the content of $P_2O_5$, $V_2O_5$, and $TeO_2$ included in the glass frit according to the disclosure may satisfy a relationship equation hereunder to ensure reliability in a calcination process in relation to a crystallization tendency.

$$V_2O_5 \text{ (wt \%)}/P_2O_5\text{(wt \%)}<3.5$$

$$P_2O_5 \text{ (wt \%)}+TeO_2 \text{ (wt \%)}>25 \qquad \text{[Relationship equation]}$$

As a greater amount of $V_2O_5$ is included, a glass transition point of the glass frit may decrease, and a temperature at which sealing is possible may decrease. However, the crystallization tendency of the glass frit may increase. Accordingly, an optimal ratio of $P_2O_5$ to $TeO_2$ needs to be ensured in a relationship between $P_2O_5$ and $TeO_2$. Accordingly, the glass frit according to the disclosure needs to have a composition ratio that satisfies all the above equations.

Additionally, the glass frit according to the disclosure may have the coefficient of thermal expansion of $80\text{-}100\times10^{-7}/^\circ$ C. such that the coefficient of thermal expansion of the glass frit matches a coefficient of thermal expansion of a glass base material and may have a softening point of 400° C. or less, for example. Since the coefficient of thermal expansion of the glass frit is included in a range of $80\text{-}100\times10^{-7}/^\circ$ C., the glass frit according to the disclosure may suppress deterioration in its adhesive force and ensure improvement in reliability in its sealing performance Additionally, since the softening point of the glass frit according to the disclosure is 400° C. or less, a process of sealing a space between the glass frit and a glass base material may be performed at a low temperature that is 400° C. or less.

Further, the glass frit according to the disclosure may have the above-described component system and composition ratio such that the glass frit has a low coefficient of thermal expansion and a low softening point without any inorganic filler or with a minimum amount of an inorganic filler.

When necessary, the glass frit according to the disclosure may include a small amount of an inorganic filler. The inorganic filler may be an inorganic crystalline particle having a low coefficient of thermal expansion, and may include one or more of zirconium phosphate, zirconium phosphate tungstate, zirconium, $Li_2O$—$Al_2O_3$—$SiO_2$, β-eucryptite, and zirconium tungstate.

Glass Frit Paste

Glass frit paste according to the present disclosure may include 100 parts by weight of the glass frit described above, and 10-100 parts by weight of an organic vehicle.

When less than 20 parts by weight or greater than 100 parts by weight of the organic vehicle is included, viscosity of the paste may be too high or too low, making it difficult to apply the paste.

The organic vehicle may include an organic solvent and an organic binder. A solvent such as α-terpineol or butyl carbitol may be used as the organic solvent, and ethyl cellulose may be used as the organic binder, but not limited.

Vacuum Glass Assembly

The vacuum glass assembly may include two or more glass base materials, and may denote an assembly in which a vacuum is maintained between the two or more glass base materials. The vacuum glass assembly may be used for electronic parts of electronic devices or home appliances such as a refrigerator, a microwave oven and a washing machine. The vacuum glass assembly may also be used for window glass for construction applied to a building.

The glass frit according to the present disclosure may be used as a sealing material for the vacuum glass assembly.

However, when the glass frit paste according to the disclosure is applied as a sealing material, a sealing process may be performed at a low temperature of less than 400° C. Accordingly, when the glass frit paste according to the disclosure is applied as a sealing material, a glass base material may be less likely to be broken and manufacturing costs may be reduced.

The vacuum glass assembly according to the present disclosure may include a first glass base material, a second glass base material spaced from the first glass base material to face the first glass base material, and a sealing material arranged along an edge of the first or second glass base material, boding the first and second glass base materials and sealing a space between the first and second glass base materials, wherein the sealing material may be formed as a result of application and calcination of the paste.

The first glass base material and the second glass base material according to the disclosure may be selected according to the needs of an item to which the vacuum glass assembly is applied but not necessarily limited.

Additionally, the glass frit paste described above may be used for the sealing material.

Aspects in the disclosure are specifically described hereunder with reference to embodiments.

Embodiment

Manufacturing of Glass Frit

A glass frit having a composition ratio shown in table 1 below was manufactured. A raw material of each component was sufficiently mixed for three hours in a V-mixer. Herein, barium carbonate ($BaCO_3$) was used as a raw material for BaO, and ammonium dihydrogen phosphate ($NH_4H_2PO_4$) was used as a raw material for $P_2O_5$. The remaining components used to manufacture the glass frit are listed in table 1. The mixed materials were melted sufficiently at 800-1000° C. for one hour and were rapidly cooled in a quenching roller to obtain a glass cullet.

An initial grain size of the glass cullet obtained in the above process was controlled using a ball mill and then was ground for about one hour using a jet mill, and then glass power was allowed to pass through a 325 mesh sieve (ASTM C285-88) to control a grain size of the glass powder, such that less than 1 g of the glass powder was left.

TABLE 1

| Component | Embodiment | | | | Comparative example | | | |
|---|---|---|---|---|---|---|---|---|
| (wt %) | 1 | 2 | 3 | 4 | 1 | 2 | 3 | 4 |
| $P_2O_5$ | 17.3 | 13 | 16.9 | 16.7 | 19.5 | 21.2 | 21.2 | 17.8 |
| $V_2O_5$ | 53.3 | 67.5 | 51.9 | 55.6 | 59.9 | 65.9 | 65.9 | 66.7 |
| CuO | 4.3 | 4.5 | 3 | 2 | 0 | 0 | 4.8 | 0 |
| ZnO | 3.2 | 3.4 | 2.1 | 3 | 0 | 3 | 3 | 0 |
| BaO | 1.8 | 1.9 | 0 | 0 | 7.5 | 0 | 0 | 9.1 |
| $Bi_2O_3$ | 0 | 0 | 14.8 | 0 | 0 | 0 | 0 | 0 |

TABLE 1-continued

| Component | Embodiment | | | | Comparative example | | | |
|---|---|---|---|---|---|---|---|---|
| (wt %) | 1 | 2 | 3 | 4 | 1 | 2 | 3 | 4 |
| $TeO_2$ | 18.3 | 7.8 | 11.3 | 11.6 | 13.1 | 7.1 | 5.1 | 0 |
| $Ag_2O$ | 1.8 | 1.9 | 0 | 11.1 | 0 | 2.8 | 0 | 6.4 |

Manufacturing of Paste

To manufacture an organic vehicle, α-terpineol and ethyl cellulose were mixed at a proper ratio. Then the mixture was mixed with the glass frit manufactured as described above at a proper ratio to manufacture paste. For a uniform mix, a three roll mill was used.

Manufacturing of Vacuum Glass Assembly Sample

Two glass base materials were prepared, and the paste in embodiments and comparative examples was applied to an outer part of each glass base material to manufacture a total of eight glass assembly samples. An evacuation process and a sealing process were performed at 400° C. for the glass assemblies. Thus, a total of eight glass assembly samples was manufactured.

Experimental Example

Properties of the glass frits, the paste and the samples manufactured in the embodiments and the comparative examples were evaluated, and results of the evaluation were listed in table 2 below.

1. Glass Transition Temperature (Tg)

A glass transition point was measured at a heating rate of 10° C./min using a TMA instrument (TMA-Q400 TA instrument).

2. Coefficient of Thermal Expansion (CTE($\times 10^{-7}$/° C.))

A coefficient of thermal expansion was measured at the heating rate of 10° C./min using the TMA instrument (TMA-Q400 TA instrument).

3. Half Ball Point

Temperatures at which the glass frit in powder form contracted to a maximum degree and had a Half Ball shape were measured using a high-temperature microscope at the heating rate of 10° C./min 4. Water Resistance The samples were put into a constant-temperature bath containing 90° C. of distilled water, and while the samples were put into the constant-temperature bath for 48 hours, a change in the color and weight of the distilled water was observed. The weight of the distilled water after the immersion of the samples was measured. Rates of the increase and decrease of the weight of the distilled water were expressed as ○ indicating less than 1% and x indicating 1% or greater.

5. Reliability in Calcination

The powdered glass frit filled a metallic mold, was press-formed and was calcined while a temperature was increasing up to 600° C. at the heating rate of 10° C./min.

Then crystallization was observed (◎ No crystallization and excellent glossiness, ○: No crystallization and good glossiness, x: Crystallization and no glossiness).

6. Adhesive Strength

The glass frits in the embodiments and the comparative examples were manufactured in a pellet form, were put on a glass plate of 100 mm×25 mm×5 mm H and were covered with a glass plate of the same size, and then were sealed at 400° C. to measure adhesive strength using an MTS (RB301 of R&B Inc.)

○: Adhesive strength measured on a commercial level

X: Adhesive strength measured below a commercial level

TABLE 2

| Component | Embodiment | | | | Comparative example | | | |
|---|---|---|---|---|---|---|---|---|
| (wt %) | 1 | 2 | 3 | 4 | 1 | 2 | 3 | 4 |
| Glass transition temperature (° C.) | 299.1 | 263.77 | 298.1 | 287.26 | 289.3 | 285.61 | 295.23 | 271.05 |
| Coefficient of thermal expansion (CTE ($\times 10^{-7}$/° C.)) | 90 | 91.07 | 90.01 | 91.89 | 93.82 | 85.65 | 75.67 | 87.27 |
| Half ball point (° C.) | 380 | 394 | 380 | 360 | 380 | 365 | 370 | 340 |
| Evaluated water resistance | O | O | O | O | X | X | X | X |
| Evaluated reliability in calcination | ◎ | O | ◎ | ◎ | X | X | X | X |
| Adhesive strength | O | O | O | O | X | X | X | X |

Table 2 above shows that the half ball point in the embodiments according to the disclosure was 400° C. or less. Accordingly, the glass frits in the embodiments may be calcined at low temperature. Additionally, the coefficient of thermal expansion ranged from 90 to 100. Accordingly, the coefficient of thermal expansion of the glass frits in the embodiments matched a coefficient of thermal expansion of the glass base materials. Further, the glass frits in the embodiments may ensure excellent water resistance, reliability in a calcination process and adhesive strength.

In the comparative examples, the glass frits had a $P_2O_5$—$V_2O_5$—$TeO_2$ composition system. The glass frits in the comparative examples had a proper half ball point and coefficient of thermal expansion. However, the glass frits in the comparative examples had the water resistance, the reliability in a calcination process and the adhesive strength that were not enough to meet the needs unlike the glass frits in the embodiments, thereby causing deterioration in reliability.

The embodiments are described above with reference to a number of illustrative embodiments thereof. However, the present disclosure is not intended to limit the embodiments and drawings set forth herein, and numerous other modifications and embodiments can be devised by one skilled in the art without departing from the technical spirit of the disclosure. Further, the effects and predictable effects based on the configurations in the disclosure are to be included within the range of the disclosure though not explicitly described in the description of the embodiments.

The invention claimed is:

1. A glass frit, comprising:
10 to 20 wt % of phosphorus pentoxide ($P_2O_5$);
50 to 70 wt % of vanadium pentoxide ($V_2O_5$);
5 to 20 wt % of tellurium dioxide ($TeO_2$);
1 to 5 wt % of copper oxide (CuO);
1 to 20 wt % of one or more of barium oxide (BaO) and zinc oxide (ZnO); and
1 to 30 wt % of one or more of bismuth oxide ($Bi_2O_3$) and silver oxide ($Ag_2O$),
wherein a total content of copper oxide (CuO), one or more of barium oxide (BaO) and zinc oxide (ZnO), and one or more of bismuth oxide ($Bi_2O_3$) and silver oxide ($Ag_2O$) is 16.1 wt % or more,
wherein the glass frit include no inorganic filler,
wherein the glass frit has a coefficient of thermal expansion (CTE) within a range of 80 to $100 \times 10^{-7}/°C$. after being calcined.

2. The glass frit of claim 1, wherein a composition of $P2O_5$, $V_2O_5$, and $TeO_2$ satisfies a following equation:
[Equation]
$V_2O_5$ (wt %)/$P_2O_5$ (wt %) <3.5
$P_2O_5$ (wt %) +$TeO_2$ (wt %) >25.

3. The glass frit of claim 1, wherein the glass frit has a softening point of 400° C. or less.

4. A glass frit paste, comprising:
100 parts by weight of the glass frit of claims 1 and 10 to 100 parts by weight of an organic vehicle.

5. A glass frit paste, comprising:
100 parts by weight of the glass frit of claims 2 and 10 to 100 parts by weight of an organic vehicle.

6. A glass frit paste, comprising:
100 parts by weight of the glass frit of claims 3 and 10 to 100 parts by weight of an organic vehicle.

7. A vacuum glass assembly, comprising:
a first glass base material;
a second glass base material spaced apart from the first glass base material and facing the first glass base material; and
a sealing material arranged along an edge of the first glass base material or the second glass base material, and configured to bond the first and second glass base materials and seal a space between the first and second glass base materials,
wherein the sealing material is formed by application and calcination of the glass frit paste of claim 5.

8. A vacuum glass assembly, comprising:
a first glass base material;
a second glass base material spaced apart from the first glass base material and facing the first glass base material; and
a sealing material arranged along an edge of the first glass base material or the second glass base material, and configured to bond the first and second glass base materials and seal a space between the first and second glass base materials,
wherein the sealing material is formed by application and calcination of the glass frit paste of claim 6.

9. A home appliance, comprising:
the vacuum glass assembly of claim 7.

10. A home appliance, comprising:
the vacuum glass assembly of claim 8.

11. A window comprising:
the vacuum glass assembly of claim 7.

12. A window comprising:
the vacuum glass assembly of claim 8.

* * * * *